Patented June 4, 1940

2,203,611

UNITED STATES PATENT OFFICE 2,203,611

22,23-DIBROMOSTIGMASTEROLACETATE AND A PROCESS OF PREPARING IT

Max Bockmühl, Gustav Ehrhart, Heinrich Ruschig, and Walter Aumüller, Frankfort-on-the-Main-Hochst, Germany, assignors to Winthrop Chemical Company, Inc., New York, N. Y., a corporation of New York No Drawing. Application September 29, 1938, Serial No. 232,304. In Germany October 14, 1937

4 Claims. (Cl. 260—397)

The present invention relates to 22,23-dibromostigmasterolacetate and to a process of preparing it.

As is known the two double bonds contained in the stigmasterol may readily be saturated with bromine whereby 5,6,22,23 - tetrabromostigmasterol is produced. The formation of the 5,6-dibromostigmasterol also succeeds if stigmasterol is treated with the calculated quantity of bromine at a low temperature. The 22,23-dibromostigmasterol, however, has hitherto not been known.

Now, we have found that 22,23-dibromostigmasterolacetate may be made from 5,6,22,23-tetrabromostigmasterolacetate by treating it with a salt of hydrogen iodide, for instance, sodium iodide. By this operation the double bond in 5,6- is regenerated with separation of iodine whereas the bromine atoms standing in 22,23- remain unaltered. This result is surprising in that nothing was known concerning the succession of the elimination of the bromine atoms.

The process occurs with nearly quantitative yields. The 22,23-dibromostigmasterolacetate is useful as starting material for syntheses in the field of the sexual hormones.

The following example serves to illustrate the invention, but it is not intended to limit it thereto:

22 grams of acetylstigmasteroltetrabromide are heated in a reflux apparatus for 2 hours in 750 cc. of benzene and 750 cc. of alcohol together with 25 grams of sodium iodide; the red solution is then concentrated under reduced pressure, the residue is mixed with water, the iodine is eliminated by shaking the whole with a solution of sodium bisulfite and the mixture is extracted with ether. The residue of the ethereal solution is purified by recrystallizing it from butyl alcohol. The melting point of the 22,23-dibromostigmasterolacetate lies at 201° C. to 202° C. (with decomposition). The yield amounts to 12.3 grams.

We claim:

1. The process which comprises reacting sodium iodide in the presence of an organic solvent with an acyl ester of 5,6,22,23-tetrabromostigmasterol.

2. The process which comprises reacting sodium iodide in the presence of an organic solvent with 5,6,22,23-tetrabromostigmasterolacetate.

3. The compound of the following formula:

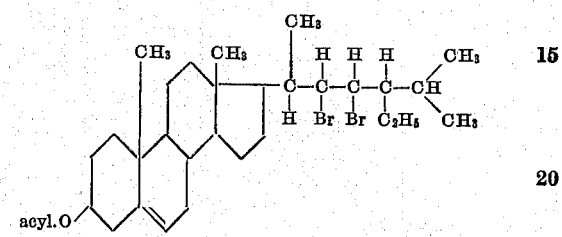

4. The compound of the following formula:

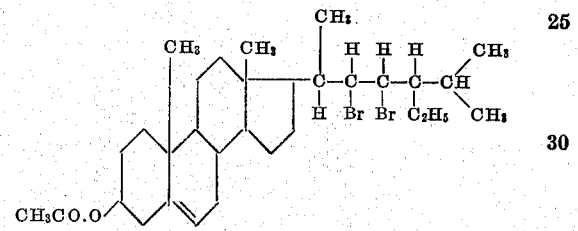

MAX BOCKMÜHL.
GUSTAV EHRHART.
HEINRICH RUSCHIG.
WALTER AUMÜLLER.